United States Patent [19]

Kohno

[11] Patent Number: 5,153,874
[45] Date of Patent: Oct. 6, 1992

[54] REDUNDANCY DATA TRANSMISSION DEVICE

[75] Inventor: Shinya Kohno, Hachioji, Japan

[73] Assignee: Kabushiki Kaisha Toshiba, Kawasaki, Japan

[21] Appl. No.: 550,024

[22] Filed: Jul. 9, 1990

[30] Foreign Application Priority Data

Jul. 10, 1989 [JP] Japan .................................. 1-177805

[51] Int. Cl.$^5$ .............................................. H04J 3/14
[52] U.S. Cl. .......................................... 370/13; 370/14; 370/16; 340/825.17
[58] Field of Search ............................. 370/14, 16, 13; 340/825.17

[56] References Cited

U.S. PATENT DOCUMENTS

| | | | |
|---|---|---|---|
| 3,564,145 | 2/1971 | Deutsch et al. | 370/14 |
| 4,251,858 | 2/1981 | Cambigue et al. | 340/825.17 |
| 4,347,605 | 8/1982 | Hashizume et al. | 370/16 |
| 4,627,045 | 12/1986 | Olson et al. | 370/16 |
| 4,658,396 | 4/1987 | Barden | 370/16 |
| 4,780,869 | 10/1988 | Engdahl et al. | 370/16 |
| 4,964,120 | 10/1990 | Mostashari | 370/14 |

OTHER PUBLICATIONS

"Redundancy in the Physical Layer of IEEE Std 802.4-1989", Token-Passing Bus, Nov. 7, 1988, pp. 44-50.

Primary Examiner—Douglas W. Olms
Assistant Examiner—Russell W. Blum
Attorney, Agent, or Firm—Foley & Lardner

[57] ABSTRACT

In a redundancy data transmission device in which a transmission signal is transmitted through all of a plurality of transmission lines constituting a redundancy transmission line and a receiving signal transmitted through any of the transmission line which is normal is selectively received, a check circuit responsive to receiving signals on the respective transmission lines for determining whether or not each of the transmission lines is normal, a detection circuit provided for the respective transmission lines for detecting sender addresses of the signals transmitted thereon, abnormality check means responsive to a determination of the check circuit and a detection of the detection circuit for determining whether or not the respective transmission lines are abnormal and for activating the switch means such that the receiving circuit is connected to a normal transmission line when abnormality is determined thereby and display means for displaying the determination made by the abnormality detection means are provided in each station.

2 Claims, 3 Drawing Sheets

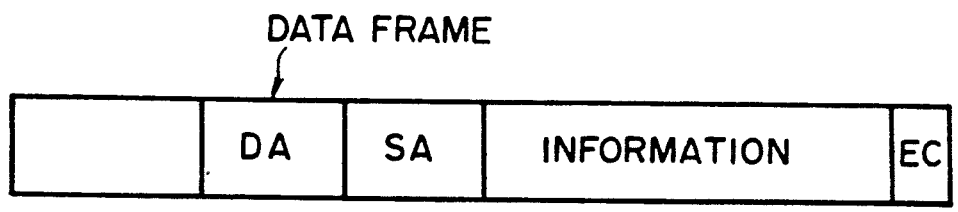
FIG. 2
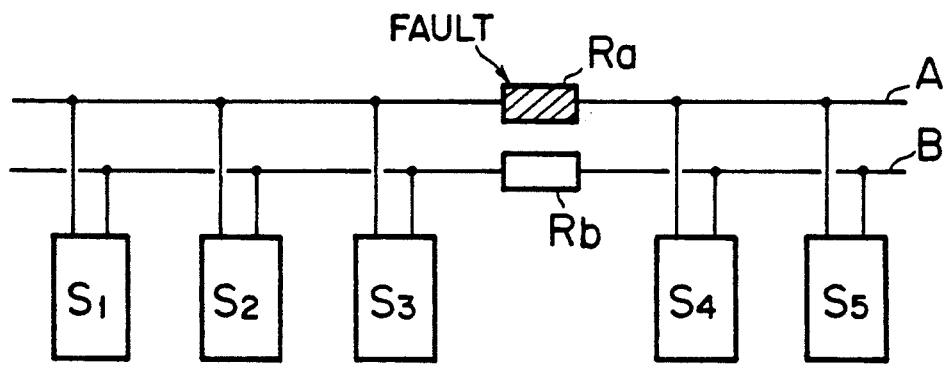
FIG. 3
| STATION | S2 | S3 | S4 | S5 |
|---|---|---|---|---|
| TRANSMISSION LINE A | NORMAL | NORMAL | ABNORMAL | ABNORMAL |
| TRANSMISSION LINE B | NORMAL | NORMAL | NORMAL | NORMAL |
FIG. 4

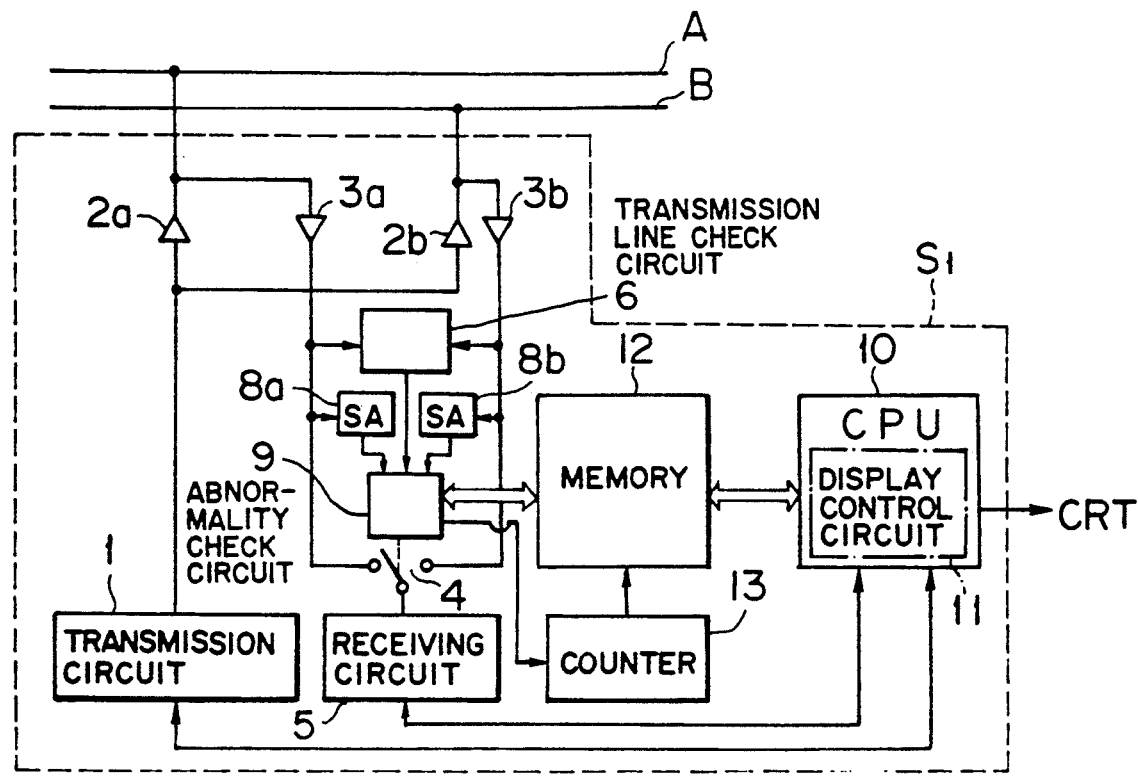
FIG. 5
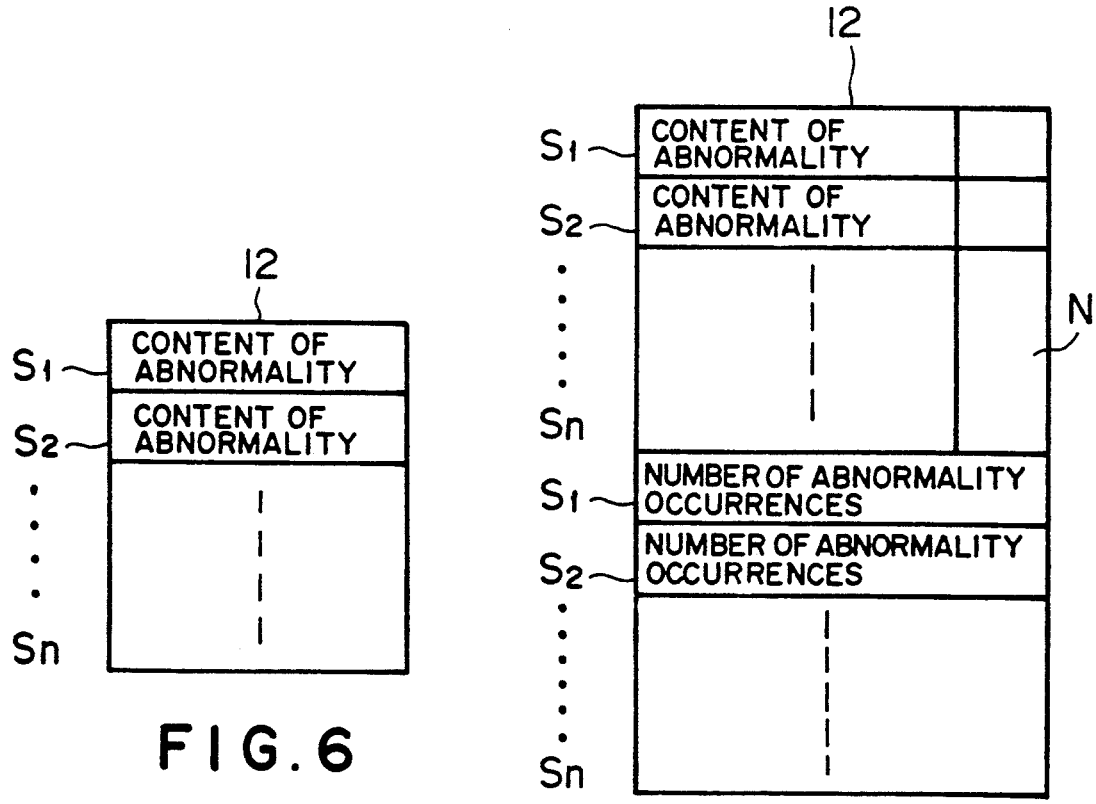
FIG. 6
FIG. 7

REDUNDANCY DATA TRANSMISSION DEVICE

FIELD OF THE INVENTION

The present invention relates to a redundancy data transmission device for transmitting data by means of a transmission line including redundancy transmission lines.

BACKGROUND OF THE INVENTION

For data transmission, it has been usual to provide redundancy transmission lines by taking into consideration the possible production of abnormal data caused by faults, and the like on a transmission line. In such a redundancy data transmission device, a transmitter sends data to all of the transmission lines and a receiver receives the data transmitted through any of these transmission lines which are normal.

A means is provided on the side of the receiver for deciding whether or not there is any abnormality of data transmitted from another station through the transmission lines so that, when the decision means determines the existence of abnormality of received data transmitted through a certain transmission line, the receiver switches the transmission line from the line related to abnormal data, to another by means of a changeover switch. When a data abnormality occurs frequently, it is considered as an abnormality of a transmission line and is displayed on a display device such as a CRT or an alert is sounded by actuating an audio device.

When abnormal data is transmitted through a certain transmission line while normal data is transmitted through another transmission line, it is considered that the abnormality occurs not in a transmission circuit of the other station but in a certain transmission. Therefore, an operator is requested to quickly indentify a location of the transmission line where such an abnormal condition exists and to remove the source of the abnormality.

Since, however, the conventional device operates to merely decide whether or not there is an abnormality in the data transmitted through a transmission line, it is difficult for an operator thereof to identify the location of the transmission line in question where the abnormality occurs. Particularly, in a case where a repeater is used to expand the transmission range and area, such identification of the abnormal point becomes more difficult.

SUMMARY OF THE INVENTION

The present invention was made in view of the above mentioned circumstances and an object thereof is to provide a redundancy data transmission device that identifies the location of a transmission line where an abnormality occurs.

In order to achieve the above object, the present redundancy data transmission device comprises a plurality of transmission lines constituting a redundancy transmission line, transmission circuits connected to the respective transmission lines for transmitting, to another station, a transmission signal having a frame construction attached, in addition to information to be transmitted, with sender address, receiver address and error detection code, a receiver circuit connectable to any one of the transmission lines for receiving a signal from another station, switch means for selectively connecting the receiver circuit to any one of the transmission lines, check means for checking whether or not each of the transmission lines is normal, detecting means provided for the respective transmission lines for detecting a sender address of the signal transmitted from another station through the respective transmission lines, abnormality check means responsive to a decision of the check means and a detection of the detecting means for checking whether or not the respective transmission lines are abnormal and for activating a switch means such that the receiving circuit is connected to a normal transmission line when abnormality is decided thereby and a display means for displaying the decision made by the abnormality detection means.

BRIEF DESCRIPTION OF THE DRAWINGS

In the accompanying drawings,

FIG. 2 illustrates a data frame to be transmitted from a transmission circuit;

FIG. 3 illustrates a plurality of stations connected to redundancy transmission lines;

FIG. 4 is a graph for use in determining an abnormal location;

FIG. 5 is a block diagram of another embodiment of the data transmission device according to the present invention; and FIGS. 6 and 7 show contents of a memory shown in FIG. 5.

DETAILED DESCRIPTION OF THE PREFERRED EMBODIMENTS

Figure 1:
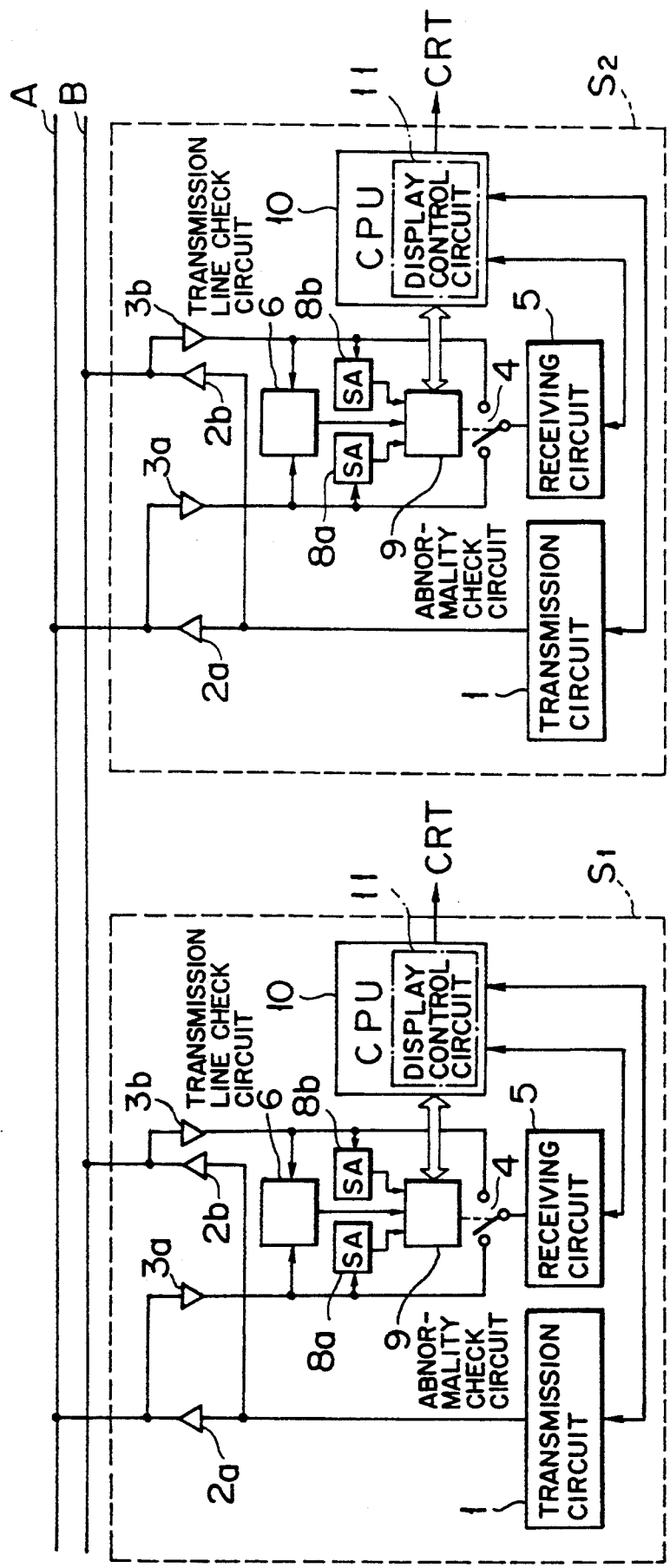
FIG. 1 is a block diagram of a data transmission device according to the present invention.

A first embodiment of a redundancy data transmission device according to the present invention will be described with reference to FIGS. 1 to 4.

In the data transmission device shown in FIG. 1, two stations S1 and S2 having identical constructions are connected through redundancy transmission lines A and B. Other stations to be connected through these transmission lines are not shown in this figure.

The stations S1 and S2 include transmission circuits 1 and receiving circuits 5, respectively. From the transmission circuit 1 a transmission signal is transmitted through transmitter drivers 2a and 2b and the transmission lines A and B to the other station. As shown in FIG. 2, the transmission signal has a frame construction including a destination address DA, a sender address SA, transmission information and an error code EC. Each of the stations S1 and S2 includes receiving drivers 3a and 3b either of which is connected to the receiving circuit 5 by means of the changeover switch 4 so that one of the transmission signals transmitted by other stations through the transmission lines A and B can be received as a receiving signal. The transmission circuit 1 and the receiving circuit 5 are controlled by a CPU 10.

Upon receiving the signals from the receiving drivers 3a and 3b, abnormalities of the respective transmission lines are checked by a transmission line check circuit 6 and the result is sent to an abnormality check circuit 9. Sender address detection circuits (SA) 8a and 8b are respectively connected to output terminals of the receiving drivers 3a and 3b. The sender address detection circuits decide a station, from which the receiving signal was sent, according to the sender address SA and sender address information is sent to the abnormality check circuit 9.

The abnormality check circuit 9 checks, according to the outputs of the transmission line check circuit 6 and the sender address detection circuits 8a and 8b, normality or abnormality of the respective transmission lines. The result of the abnormality check circuit 9 is transmitted to the CPU 10 which operates the changeover switch 4 so that a receiving signal that has been determined as normal can be fed to the receiving circuit 5. The CPU 10 includes a display control circuit 11 through which the check result of the abnormality check circuit 9 is displayed on a display such as cathode ray tube (CRT).

An operation of the device constructed as mentioned above will be described mainly for the station S1.

For a signal transmission from the station S1 to other stations, the signal having a frame construction shown in FIG. 2 is transmitted from the transmission circuit 1 through the transmission drivers 2a and 2b and the transmission lines A and B to these other stations.

Identical transmission signals transmitted from these other stations through the respective transmission lines A and B are received at the receiving drivers 3a and 3b of the station S1. Only one of the receiving signals received by the receiving drivers 3a and 3b is introduced to the receiving circuit 5 through the changeover switch 4 whose position is set according to the check result of the abnormality check circuit 9 which is based on the check results of the transmission line check circuit 6 and the sender address detection circuits 8a and 8b.

In the case where the check result of the abnormality check circuit 9 indicates the normality of both transmission lines, there is no need of actuation of the changeover switch 4.

It is assumed that, as shown in FIG. 3, a plurality of stations, for example, five stations S1, S2, S3, S4 and S5 are mutually connected through the transmission lines A and B and that repeaters Ra and Rb are inserted into the transmission lines A and B between the stations S3 and S4. In this system construction, it is further assumed that the station S1 receives signals transmitted from the other stations S2 to S5.

It is still further assumed that, as shown in FIG. 4, data transmitted through the transmission line B are normal for all stations and, for data transmitted through the transmission line A, data from the stations S2 and S3 are normal and data from the stations S4 and S5 are abnormal. According to FIG. 4, data on the transmission line A changes from normal to abnormal between the station S3 to the station S4 and there is a repeater Ra provided thereat. Therefore, an operator can easily estimate, from this information, the occurence of some abnormality in the repeater Ra.

FIG. 5 shows another embodiment of the data transmission device according to the present invention. In this embodiment, the information from the abnormality check circuit 9 is not sent directly to the CPU 10. That is, it is written in a memory 12 and the CPU 10 reads it periodically. With this construction, the load on the CPU 10 can be reduced. In this case, a memory address is preferably made to correspond to the sender address SA, that is, the station code, as shown in FIG. 6. The memory 12 may comprise a FIFO buffer.

As shown in FIG. 7, the memory 12 may contain, in addition to the content of abnormality, the number of occurences of an abnormality. The abnormalities are counted by a counter 13 (FIG. 5). In this case, the load of the CPU 10 is further reduced and it is possible to know the importance of an abnormality from the number of occurences of it.

In the memory 12 shown in FIG. 7, it is possible to identify the station or stations which actually operate for normal data transmission, by adding, to a region indicative of the content of an abnormality of a transmission line, a region N indicative of the normality or abnormality of transmission line. That is, it is possible to know that stations are in a rest condition when this region N indicates neither abnormality or normality.

What is claimed is:

1. A redundancy data transmission device comprising:

a plurality of transmission lines constituting a redundancy transmission line;

transmission circuits connected to each of said transmission lines for transmitting, to another device, a transmission signal having information to be transmitted, a sender address, receiver address and an error detection code;

a receiver circuit connectable to any one of said transmission lines for receiving a signal from said another device;

switch means for selectively connecting said receiver circuit to any one of said transmission lines;

check means for checking whether or not each of said transmission lines is normal;

detecting means provided for each of said transmission lines for detecting said sender address of the signal transmitted from said another device through said each of said transmission lines;

abnormality check means responsive to said check means and said detecting means for determining whether or not said each of said transmission lines is abnormal for each corresponding sender address and for activating said switch means such that said receiver circuit is connected to a normal transmission line when abnormality is determined thereby;

a memory for storing check data obtained by said abnormality check means, said memory storing said check data at address locations corresponding to each corresponding sender address; and display means, connected to receive data from said abnormality check means, for displaying the determination made by said abnormality check means together with an indication of said corresponding sender address.

2. A redundancy data transmission device comprising:

a plurality of transmission lines constituting a redundancy transmission line;

transmission circuits connected to each of said transmission lines for transmitting, to another device, a transmission signal having information to be transmitted, a sender address, receiver address and an error detection code;

a receiver circuit connectable to any one of said transmission lines for receiving a signal from said another device;

switch means for selectively connecting said receiver circuit to any one of said transmission lines;

check means for checking whether or not each of said transmission lines is normal;

detecting means provided for each of said transmission lines for detecting said sender address of the signal transmitted from said another device through said each of said transmission lines;

abnormality check means responsive to said check means and said detecting means for determining whether or not said each of said transmission lines is abnormal for each corresponding sender address and for activating said switch means such that said receiver circuit is connected to a normal transmission line when abnormality is determined thereby;

a memory for storing check data obtained by said abnormality check means, said memory including a region for storing the status of said each of said transmission lines as being normal or abnormal as well as a characteristic of a detected abnormality, and said memory storing said check data at address locations corresponding to each corresponding sender address; and display means, connected to receive data from said abnormality check means, for displaying the determination made by said abnormality check means together with an indication of said corresponding sender address.

* * * * *